United States Patent Office 3,471,258
Patented Oct. 7, 1969

3,471,258
PROCESS FOR THE PRODUCTION OF RED,
TRANSPARENT αFe₂O₃ FLAKES
Lothar H. Brixner, West Chester, Pa., assignor to E. I. du
Pont de Nemours and Company, Wilmington, Del., a
corporation of Delaware
No Drawing. Filed Sept. 27, 1967, Ser. No. 671,108
Int. Cl. C01g 49/06; C09c 1/24
U.S. Cl. 23—200          3 Claims

ABSTRACT OF THE DISCLOSURE

Red, transparent flakes of $\alpha Fe_2O_3$ are prepared by the reaction: $2FeCl_3 + 3HOH \rightarrow Fe_2O_3 + 6HCl$ by crystallization from a salt melt containing at least one alkali-metal halide.

BACKGROUND OF THE INVENTION

Crystals of $\alpha Fe_2O_3$ are well known and, in pigmentary size ranges, such crystals have been used as a nacreous component of paints and other coating materials. There is disclosed, for example in U.S. 2,989,411, a process for the production of nacreous iron oxide pigment by crystallization from a salt melt comprising an alkali metal borate or boric oxide, followed by water washing, acidification, and finally filtering and washing the pigment. However, the methods which have previously been described for the preparation of red, transparent flakes of $\alpha Fe_2O_3$ have not been economically feasible for such reasons as the necessity for small scale operation, production of corrosive by-products, use of expensive raw materials, or expensive finishing procedures.

SUMMARY OF THE INVENTION

In accordance with the present invention a process is provided wherein an air stream saturated with water is passed into the melt of a dry blend of ferric chloride and an alkali metal halide to form red, transparent, crystalline flakes of $\alpha Fe_2O_3$ according to the reaction:

$$2FeCl_3 + 3HOH \rightarrow Fe_2O_3 + 6HCl$$

When the reaction is completed, the iron oxide product is recovered, preferably by cooling the melt, leaching, filtering, and washing the crystals. The temperature of operation is a temperature above the melting point of the salt blend but below the point at which excessive fuming is evident. A suitable temperature range has been found to be from about 700° C. to about 1100° C.

The following examples are cited to illustrate the invention. They are not intended to limit it in any manner.

Example 1

113 g. of FeCl₃ and 113 g. of NaCl, dry blended and charged into an alumina container (500 ml. volume) is heated to 700° C. at which point it becomes molten. Water vapor is then passed through the melt by means of an H₂O-saturated air stream for a period of three hours. The crucible and contents are then rapidly cooled by air-quenching. The solidified melt is water leached to dissolve the salt and the crystals of $\alpha Fe_2O_3$ are recovered by filtration and are water washed. By means of wet-screening (U.S. standard sieves) the crystals are fractionated by size as follows:

|                | G. |
|----------------|-----|
| −25+100 mesh   | 2.0 |
| −100+200       | 3.0 |
| −200+325       | 6.0 |
| −325+400       | 6.0 |
| −400+30μ       | 6.0 |
| −30μ+20μ       | 5.0 |
| Total          | 28.0 |

This represents a 68% yield on the FeCl₃ contained in the melt.

The $\alpha Fe_2O_3$ crystals thus produced are found by X-ray examination to be $\alpha Fe_2O_3$ platelets in red, transparent, single-crystal form. They are characterized by a refractive index of 4.8 and showed lattice parameters of $a=5.03$ A. and $c=13.73$ A., the thin dimension corresponding to the c-axis.

When these crystals are incorporated in clear varnish and drawn down on a standard black-and-white hiding power chart, the platelets exhibit a sparkling appearance.

Example 2

A dry blend of 50 grams of FeCl₃ and 200 grams of NaCl, charged in an alumina container (500 ml. volume) is heated to 1100° C. and an H₂O-saturated air stream is bubbled through the melt for a period of 3 hours. At the conclusion of this time the crucible and its contents are air quenched, and the iron oxide crystalline product is separated from the salt by leaching, filtering, washing, and drying.

The $\alpha Fe_2O_3$ crystals produced by this example are examined by X-ray and were found to be identical with the product of Example 1, with the exception that a larger amount of the coarser crystalline fractions is obtained.

The $\alpha Fe_2O_3$ crystals thus produced are incorporated in a hard, clear, acrylic plastic, such as is used for counter tops, and the plastic exhibits a very attractive sparkling appearance.

Example 3

A dry blend prepared of 133.5 grams NaCl, 66.5 grams KCl, and 66.5 grams FeCl₃ is subjected to the same crystallization procedure described in Examples 1 and 2, except that the reaction is carried out at 900° C. for a period of 4 hours.

As in the previous two examples, X-ray examination of the crystal product of this example showed it to be $\alpha Fe_2O_3$ platelets of the same characteristics as in the previous examples. These crystals are incorporated into soft vinyl plastics such as woudl be used in upholstery materials or auto seat covers, and provide an attractive, sparkling appearance.

Example 4

The process of Example 2 is carried out except that the alkali metal halide used is KCl, the ratio by weight of KCl:FeCl₃ is 2:1, and the reaction is carried out at a temperature of 800° C. for a period of 5 hours.

A product is obtained by this reaction, identical in form to that obtained in Example 2, except that a larger proportion of the crystalline product is found to be of finer particle size fractions than when the operation is carried out at the higher temperatures of Example 2.

The product of this example is incorporated into a clear paint vehicle such as would be used in an auto finish, and produces a nacreous effect in the paint drawdown.

Example 5

The same process as is described in the previous example is carried out except that the alkali metal halide used is NaBr and the weight ratio of this salt to FeCl₃ is 2:1. The salt melt is heated at 800° C. for 2 hours, and the $\alpha Fe_2O_3$ crystals are recovered by leaching, washing, and drying. The product is similar in all respects to that of Example 1.

Although for economic reasons (use of NaCl as the alkali metal halide and operational temperature of 700° C. for a relatively short reaction time) the process as described in Example 1 above is the preferred process for the operation of this invention, it will be seen from the examples that any alkali metal halide may be used in the salt melt with ferric chloride, the temperature of operation may be any desired temperature between 600° and 1100° C., and the time for carrying out the reaction may be from 2 to 5 hours. As noted in the examples, operation in the higher part of the temperature range will result in the crystallization of $\alpha Fe_2O_3$ in larger particle sizes than when operation is carried out in the lower part of the temperature range. Also, although batchwise operation had been described, it will be recognized that the process may be adapted to continuous operation. Thus, it is contemplated that by continuous or batch-wise addition of $FeCl_3$ and the alkali metal halide which is used, and by continuous bubbling of the $H_2O$-saturated air stream into the melt, continuous or periodic withdrawal of the salt melt containing the crystallized $\alpha Fe_2O_3$ is possible. For convenience of operation, the container for the salt melt and the contents of the crucible have been air quenched and the crystals removed by leaching, but a batch-wise process wherein the crystallized $Fe_2O_3$ is allowed to settle out from the salt melt, the supernatant molten salt is decanted off and the $Fe_2O_3$ crystal product withdrawn from the bottom of the container is considered to be within the limits of the invention.

Many equivalent modifications will become apparent to those skilled in the art from a reading of the above without a departure from the inventive concept.

What is claimed is:

1. A process for the preparation of red, transparent, single crystal platelets of $\alpha Fe_2O_3$ which comprises the steps of (1) preparing a salt melt comprising $FeCl_3$ and at least one alkali metal halide, the weight ratio of alkali metal halide to $FeCl_3$ being from 1:2 to 4:1, (2) bubbling through said melt and $H_2O$-saturated gas stream for a period of from 2 to 5 hours while maintaining the temperature of said melt at from 600° C. to 1100° C., and (3) separating the resulting crystals of $\alpha Fe_2O_3$ from the salt melt.

2. The process according to claim 1 in which the alkali metal halide is sodium chloride.

3. The process of claim 1 in which the alkali metal halide is sodium chloride, the weight ratio of sodium chloride to $FeCl_3$ is 1:1, the temperature of operation is 700° C., and the time of reaction is 3 hours.

References Cited

UNITED STATES PATENTS

| | | | |
|---|---|---|---|
| 1,721,485 | 7/1929 | Kersten | 23—186 |
| 2,002,859 | 5/1935 | Levy et al. | 23—200 X |
| 2,013,401 | 9/1935 | Booth. | |

OTHER REFERENCES

Mellor: "Comprehensive Treatise on Inorganic and Theoretical Chemistry" (1934), vol. 13, p. 778.

OSCAR R. VERTIZ, Primary Examiner

G. T. OZAKI, Assistant Examiner

U.S. Cl. X.R.

23—1; 106—304